United States Patent [19]
Famili

[11] Patent Number: 5,490,435
[45] Date of Patent: Feb. 13, 1996

[54] ENERGY ABSORBING STEERING WHEEL

[75] Inventor: Babak R. Famili, Troy, Mich.

[73] Assignee: Chrysler Corporation, Highland Park, Mich.

[21] Appl. No.: 295,561

[22] Filed: Aug. 25, 1994

[51] Int. Cl.[6] .................................................. B62D 1/04
[52] U.S. Cl. ................................................ 74/552
[58] Field of Search ................................. 74/552

[56] References Cited

U.S. PATENT DOCUMENTS

| | | | |
|---|---|---|---|
| 1,789,817 | 1/1931 | Husted | 74/552 |
| 2,041,738 | 5/1936 | Beck | 74/552 |
| 3,714,844 | 2/1973 | Tsuda | 74/552 |
| 4,061,054 | 12/1977 | Wenninger | 74/552 |
| 4,201,830 | 5/1980 | Wollen | 428/375 |
| 4,468,978 | 9/1984 | Takahara et al. | 74/552 |
| 4,709,944 | 12/1987 | Hongo et al. | 74/552 X |
| 4,875,387 | 10/1989 | Henigue | 74/552 |
| 4,909,097 | 3/1990 | Henigue | 74/552 |
| 4,946,194 | 8/1990 | Maeda et al. | 280/777 |
| 4,975,235 | 12/1990 | Henigue | 74/552 X |
| 5,070,742 | 12/1991 | Sakane et al. | 74/552 |
| 5,085,097 | 2/1992 | Harata et al. | 74/552 |
| 5,097,720 | 3/1992 | Drefahl | 74/552 |
| 5,243,877 | 7/1993 | Numata | 74/552 |

Primary Examiner—Rodney H. Bonck
Assistant Examiner—MaryAnn Battista
Attorney, Agent, or Firm—Margaret A. Dobrowitsky

[57] ABSTRACT

An improved energy absorbing lightweight vehicle steering wheel constructed of a rim portion, a spoke portion and a hub portion arranged in the same plane having continuous downwardly extending flanges and is made of an aluminum alloy consisting of at least 95% aluminum and at least 1% magnesium. The steering wheel yields at a constant load level to a large deformation by absorbing impact energy during a vehicle impact to avoid injury to the vehicle operator.

20 Claims, 6 Drawing Sheets

(PRIOR ART)

FIG.17

(PRIOR ART)

ENERGY ABSORBING STEERING WHEEL

FIELD OF THE INVENTION

The present invention generally relates to an energy absorbing vehicle steering wheel and more particularly, relates to an energy absorbing vehicle steering wheel that has continuous flanges on the rim, the spoke and the hub area of the wheel and is made of a lightweight aluminum/magnesium alloy.

BACKGROUND OF THE INVENTION

In the design of a vehicle steering wheel, several important performance requirements must be satisfied. These performance requirements include the capability of the wheel to minimize or prevent vibration during operation of the vehicle and to absorb energy during a vehicle impact to provide for the safety of the vehicle operator. Generally, a steering wheel of low mass leads to a smaller inertia which decreases the effect of road vibration and offers less resistance to turning. From a safety point of view, it is desirable to have a steering wheel collapse (or deform) upon impact by the body of a vehicle operator during an accident in order to absorb the energy of the impact over a longer period of time. This important safety feature is not achievable when the steering wheel is rigid.

In a vehicle where an air bag is employed to further protect the vehicle operator, it is important to design a steering wheel which works cooperatively with the air bag in order to maximize the energy absorption capability of the air bag and the steering wheel. Ideally, the steering wheel should tilt with the lower portion moving back and the upper portion moving forward or staying at its position to offer a broader area for support of the vehicle operator's body such that it works in combination with the energy absorbing effect of the air bag. The desirability to design an energy absorbing steering wheel made of a lightweight material adds another performance requirement in that the lightweight steering wheel not only has to be energy absorbing, but also has to be strong enough to function properly in the normal operation of a vehicle.

Many designs and constructions for lightweight steering wheels have been proposed in the past. For instance, U.S. Pat. No. 3,714,844 to Tsuda discloses a steering wheel consisting of a light frame integrally molded from a flat plate. The steering wheel disclosed has a frame with ring, spoke and boss portions wherein the spoke portion has cuts to absorb mechanical shocks, the ring portion is non-circular and the spoke portion encloses an air bag. The ring portion has a required bent or curved cross-section, the spoke portion has a concave-convex, bent or curved cross-section, and the boss portion has an aperture for mounting to the boss. The steering wheel requires complicated manufacturing process since each portion of the wheel has a different cross-section, and furthermore each portion may be made of a different material. None of the previously designed wheels has taken into consideration the requirement of having all the components of a steering wheel to fail or to yield at the same load and at the same time.

It is therefore an object of the present invention to provide a vehicle steering wheel that does not have the drawbacks of prior art steering wheels.

It is another object of the present invention to provide a lightweight vehicle steering wheel that has components of the wheel designed in such a way that all the components fail or yield at the same load and at the same time.

It is a further object of the present invention to provide a vehicle steering wheel that has a rim portion, a spoke portion and a hub portion made of a lightweight aluminum alloy containing at least 95% aluminum.

It is another further object of the present invention to provide a lightweight vehicle steering wheel that has a rim portion, a spoke portion and a hub portion where all portions have continuous downwardly extending flanges designed in such a way that all portions fail and yield at the same load upon impact by the body of a vehicle operator.

It is still another further object of the present invention to provide a lightweight vehicle steering wheel that has a rim portion, a spoke portion and a hub portion equipped with continuous downwardly extending flanges and is made of an aluminum alloy consisting of at least 95% aluminum and at least 1% magnesium such that all portions fail and yield at the same load upon impact by the body of a vehicle operator.

It is yet another further object of the present invention to provide a lightweight vehicle steering wheel that has a rim portion, a spoke portion and a hub portion with continuous downwardly extending flanges and is made of an aluminum alloy such that all portions fail or yield at a minimum load of approximately 650 pounds and continuously yielding at such constant load so that the impact load exerted on the body of the vehicle operator is not increased during such impact.

SUMMARY OF THE INVENTION

In accordance with the present invention, a vehicle steering wheel that has a rim portion, a spoke portion and a hub portion where all portions have continuous downwardly extending flanges and is made of an aluminum alloy consisting of at least 95% aluminum is provided.

The lightweight vehicle steering wheel provides exceptional energy absorbing capabilities. It also provides sufficient strength during the normal operation of a vehicle to properly function as a steering wheel. However, during a vehicle impact, a minimum load of approximately 650 pounds deforms the steering wheel and continues such deformation at the constant load to cause the total deformation of the steering wheel to reach approximately 4" to 5". During the deformation, the load exerted on the body of the vehicle operator is kept constant and not increased thereby protecting the vehicle operator from injuries.

The present invention recognizes an important performance requirement for a steering wheel, i.e., to provide a safe driving environment, by designing the wheel to yield at a relatively low load and then continuously yielding at such constant load. This important requirement can only be achieved by using a combination of a unique design of the steering wheel i.e., having continuous downwardly extending flanges, and a unique material for the wheel which consists of at least 95% aluminum and at least 1% magnesium.

BRIEF DESCRIPTION OF THE DRAWINGS

Other objects, features and advantages of the present invention will become apparent upon consideration of the specification and the appended drawings, in which.

DETAILED DESCRIPTION OF THE PREFERRED AND ALTERNATE EMBODIMENTS

The present invention discloses an improved lightweight vehicle steering wheel that has a rim portion, a spoke portion and a hub portion where all portions have continuous downwardly extending flanges and are made of an aluminum alloy consisting of at least 95% aluminum and at least 1% magnesium.

Figure 1:
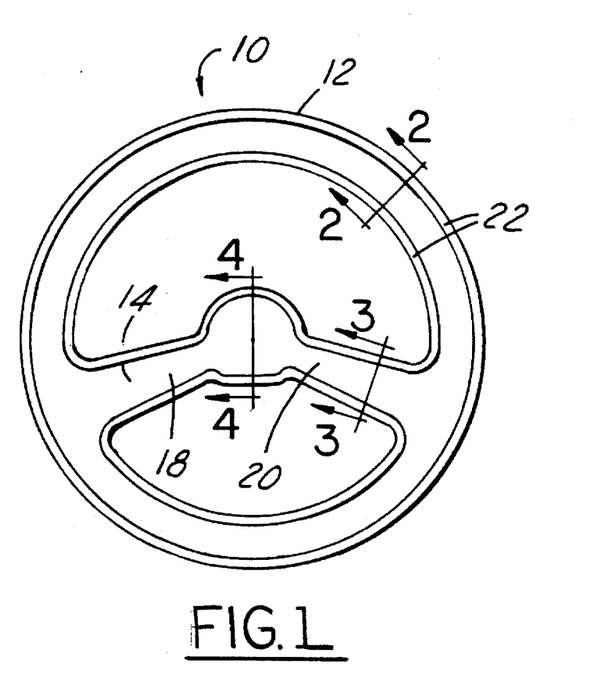
FIG. 1 is a top view of the present invention steering wheel in its preferred embodiment.

Referring initially to FIG. 1 wherein a present invention vehicle steering wheel 10 is shown in a preferred embodiment. The steering wheel 10 has a rim portion 12, a spoke portion 14 and a hub portion 16. In this preferred embodiment, the spoke portion has two broad arms 18 and 20, the left and right arms, that are downwardly angled from hub 16 as viewed by the vehicle operator and integrated with rim 12.

Figure 2:
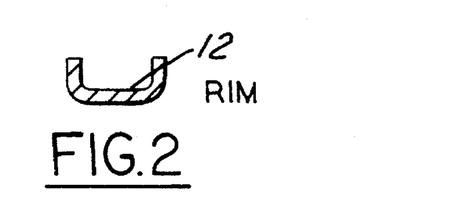
FIGS. 2, 3 and 4 are enlarged cross-sectional views of the rim portion, the spoke portion and the hub portion of the wheel shown in FIG. 1 taken along 2—2, 3—3 and 4—4.
Figure 3:
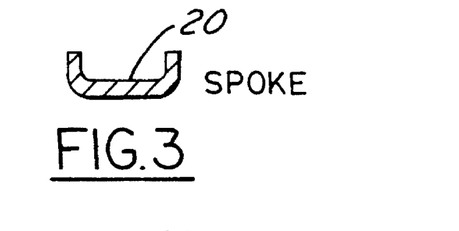
Figure 4:
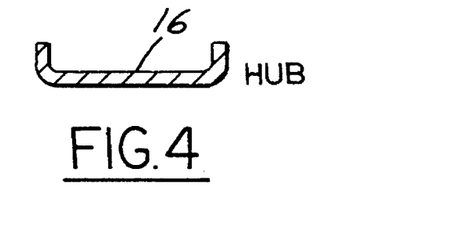

FIGS. 2, 3 and 5 are enlarged cross-sectional views of the rim portion, the spoke portion and the hub portion of the wheel shown in FIG. 1 taken along 2—2, 3—3 and 4—4.

Figure 5:
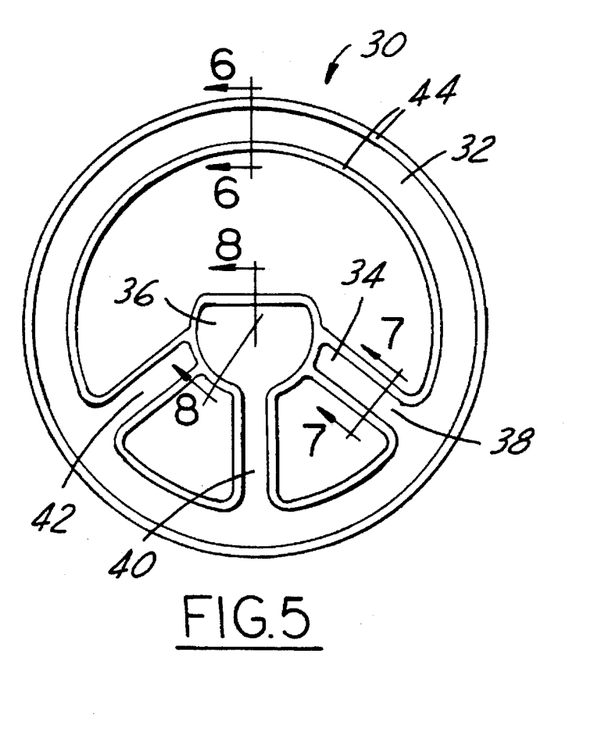
FIG. 5 is a top view of the present invention steering wheel in an alternate embodiment.
Figure 6:
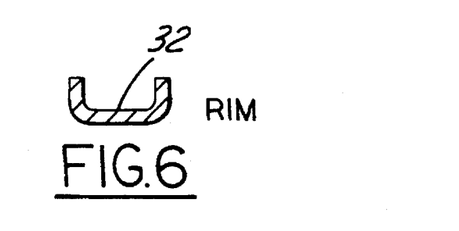
FIGS. 6, 7 and 8 are enlarged cross-sectional views of the rim portion, the spoke portion and the hub portion of the wheel shown in FIG. 5 taken along 6—6, 7—7 and 8—8.
Figure 7:
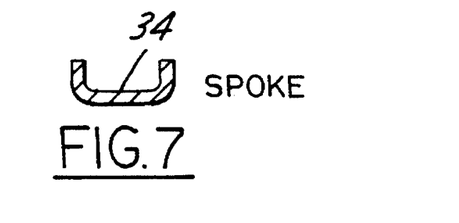
Figure 8:
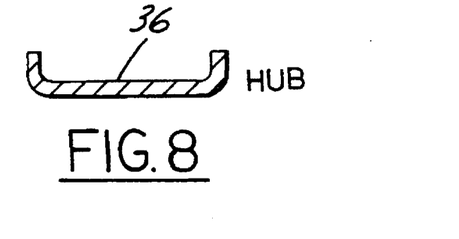

FIG. 5 shows a present invention vehicle steering wheel 30 in an alternate embodiment. It is shown that the steering wheel 30 has a rim portion 32, a spoke portion 34 and a hub portion 36. The spoke portion 34 is constructed of three broad arms 38, 40 and 42, i.e. the right, center and left arms, which are downwardly angled from hub 36 as viewed by the vehicle operator and integrated with rim 32. The enlarged cross-sectional view of the rim 32, the spoke 38 and the hub 36 are shown in FIGS. 6, 7 and 8.

As shown in FIGS. 1 and 5, the steering wheels in both the preferred and the alternate embodiments have continuous downwardly extending flanges 22 and 44. The depth of the flanges is normally between about ⅛" to about 1". A preferred depth of the flanges is between about ¼" to about ¾". A more preferred depth of the flanges is between about ¼" to about ½".

It is believed that the flanges contribute greatly to the unique property of the present invention vehicle steering wheels by allowing all portions of the wheel to yield simultaneously under a constant load. Experimental data has shown that in a vehicle steering wheel of this type, approximately 50% of the impact energy is absorbed by the rim portion, approximately 40% of the impact energy is absorbed by the spoke portion and approximately 10% of the impact energy is absorbed by the hub portion during a vehicle impact.

The depth of the flanges is normally the same for the rim, the spoke and the hub. However, under special circumstances where a specific portion of the steering wheel needs to be reinforced, deeper flanges may be used in such portions. For instance, the depth of the flanges can be made deeper in the spokes such that the spoke portion will carry more load. The design of the depth of the flanges is performed by computer finite element analysis and also by laboratory crash analysis. The geometry of the spokes, the number of the spokes and their locations can be designed in unlimited number of ways in order to suit a special requirement in a specific vehicle steering wheel design. It is sometimes preferred to make the hub portion thicker such that more material is used to reduce or eliminate the requirement of reinforcing ribs or flanges.

It is an important design consideration to have the rim portion of the present invention vehicle steering wheel to start yielding at a load between about 500 pounds to about 800 pounds. The unique design of the present invention steering wheel with the continuous flanges allows the whole wheel to continuously collapse under such constant load without increasing the load on the vehicle operator during an impact. This provides a greatly improved safety driving environment to the vehicle operator.

It should be noted that while the present invention steering wheel is designed to collapse at a certain load, it performs its normal steering functions properly when a suitable ultimate tensile strength of the wheel is maintained. The present invention wheel therefore realizes the benefits of a high ultimate strength at between 20 to 40 ksi and a high elongation at between 10% to 15%. This unique combination of a high elongation which allows a 3" to 5" deformation of the steering wheel and a high ultimate tensile strength which allows the rim and the spoke to withstand normal operating conditions.

The configurations of the spokes as well as their cross-sections contribute to the energy absorbing characteristics of the steering wheel. They allow the wheel to deform and to absorb energy at a constant level of load, i.e. without increasing the impact force exerted on the body of the vehicle operator during an impact. It has been found in laboratory tests that a force of 2,000 pounds is exerted on the steering wheel during an impact by the body of a vehicle operator at a 30 mph speed. At load levels higher than 2,500 pounds, injury could occur to the vehicle operator.

The light weight of the present invention steering wheel also contributes to the total characteristics of the wheel by increasing the natural frequency of the wheel and the comfort level of operation.

In a vehicle equipped with an air bag, the present invention vehicle steering wheel provides a perfect match with the energy absorbing characteristics of the bag. Laboratory tests have shown that the lower portion of the rim of a steering wheel starts bending at a load between 400 to 500 pounds. The present invention steering wheel works perfectly with an air bag when the bag is installed between the spokes in the hub area. The air bag distributes the load upon impact while the rim of the steering wheel absorbs the load by deforming. At the same time, the air bag deflates by absorbing the impact energy. It is therefore an important consideration of the present invention to select a material for the steering wheel that is capable of deforming at a pre-designed load level and then continuously deforming at such load.

A suitable material to be used in the present invention vehicle steering wheel should have a sufficient ultimate tensile strength and a high elongation after yielding. It was discovered that aluminum, because of its high strength and high ductility, yields at a modest load level and then continues yielding by absorbing the impact energy. A suitable aluminum alloy composition is shown in Table 1. All percentages shown are in weight percent. The composition contains between 1 to 5% magnesium, 0.7% iron, 0.3% silicon, 0.2–0.4% manganese, 0.1% zinc, and trace amount of Cu, Be, Sn, Ni, Ti, Cr, Pb and N with the balance being aluminum. The steering wheel can be made by either a stamping process or a die cast process.

TABLE 1

| Chemical Compositions (wt. %) | | |
| --- | --- | --- |
| Si | 0.3 | max |
| Fe | 0.7 | max |
| Cu | .03 | max |
| Mn | 0.2–0.4 | |
| Mg | 1.0–5.0 | |
| Be (ppm) | 30–50 | |
| Sn | .01 | max |
| Zn | .10 | max |
| Ni | .01 | max |
| Ti | .01 | max |
| Cr | .01 | max |
| Pb | .01 | max |
| N (ppm) | 10.0 | max |
| Al | Remainder | |

Table 2 shows the mechanical properties obtained in laboratory tests on the aluminum composition.

TABLE 2

| Mechanical Properties | |
| --- | --- |
| Ultimate Tensile Strength | 26.0 KSI min. |
| Yield Strength @ 0.2% | 9.80 KSI min. |
| % Elongation | 10.0% min. |
| Modulus of Elasticity | 10.2 KSI min. |

It is to be noted that a suitable ultimate tensile strength for the material used in present invention steering wheel should be in the range between 20 to 40 ksi and the % elongation should be in the range between 10% to 15%. Such % elongation allows a 3–5" deformation in the steering wheel so that it performs satisfactorily for energy absorbing purpose during a vehicle impact.

Figure 9:
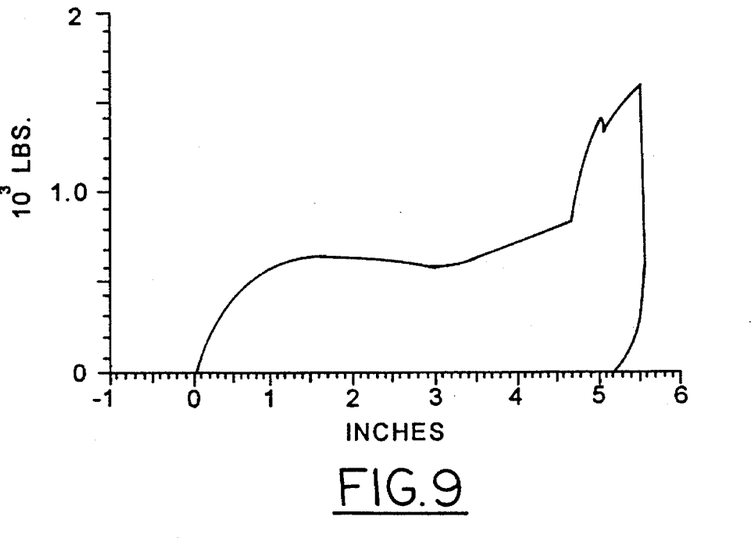
FIG. 9 is a graph showing a force-deflection curve for sample steering wheel #1.

FIG. 9 shows a force-deflection curve for sample steering wheel #1 indicating a yield of the steering wheel at approximately 650 pound-force. The yield point starts at approximately 1" deflection and continues at a constant load of 650 pounds to approximately 3" deflection before the load is increased to a total failure of the wheel at about 5" deflection. It is to be noted that this wide range of deflection (i.e., between 1" to 3") is an important feature of the present invention which allows the steering wheel to absorb the impact energy during a vehicle impact. The vehicle operator is thus protected from injuries which would otherwise occur by the increasing load exerted on the body of the vehicle operator.

Figure 10:
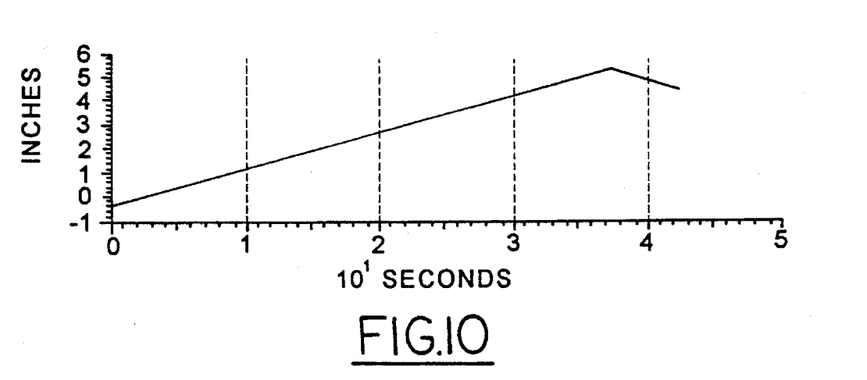
FIG. 10 is a graph showing deflection-time curve for sample steering wheel #1.
Figure 11:
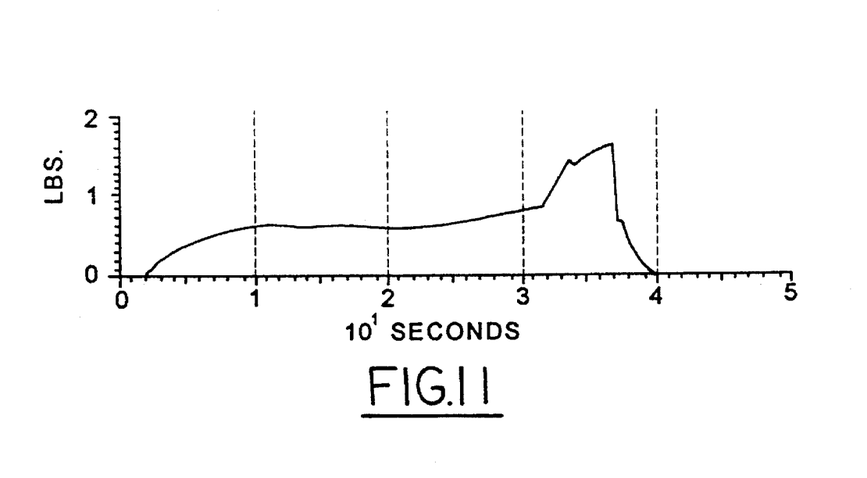
FIG. 11 is a graph showing a force-time curve for sample steering wheel #1.

FIG. 10 is a graph showing a deflection versus time curve for sample steering wheel #1 indicating that the deflection increases at a constant rate with time. FIG. 11 is a graph showing a force-time curve for sample steering wheel #1 which indicates a constant force is exerted on the steering wheel between the approximately 10 to 30 seconds time interval.

Figure 12:
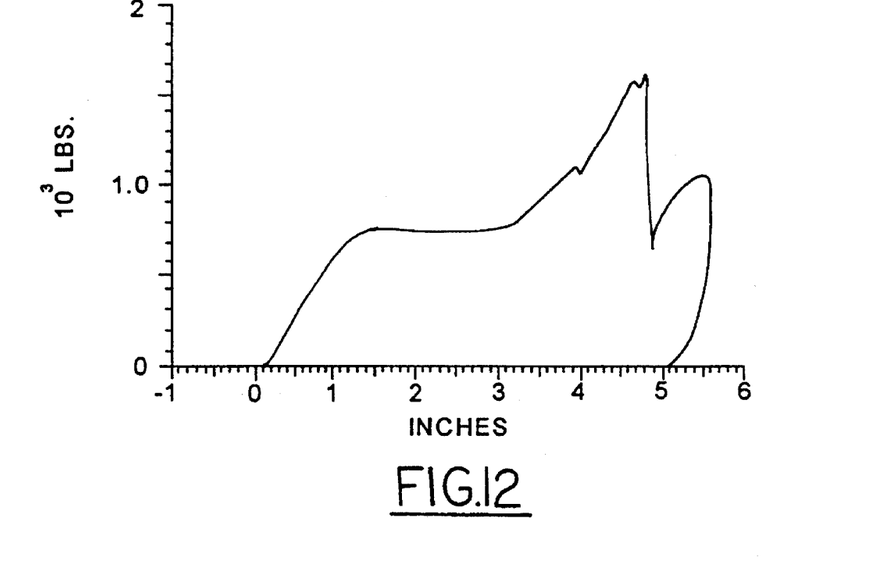
FIG. 12 is a graph showing force-deflection curve for sample steering wheel #2.

FIG. 12 is a force-deflection curve for sample steering wheel #2 indicating a load level of 764 pounds at the beginning of the yield of the steering wheel. Again, it is seen that the load remains essentially constant during deformation between the 1" deflection and the 3" deflection before the load increases drastically to a total failure. The sample steering wheel while exhibiting a slightly higher load at yield than that shown in FIG. 9, nevertheless shows a consistent yield behavior made possible by the present invention.

Figure 13:
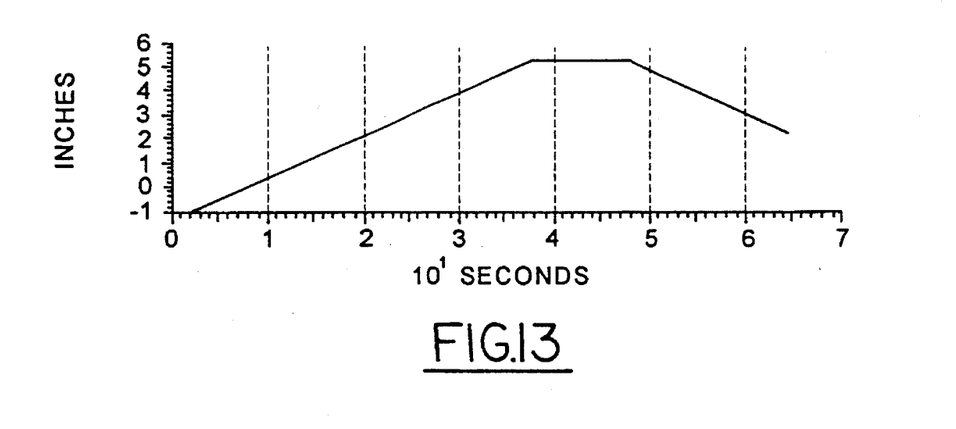
FIG. 13 is a graph showing deflection-time curve for sample steering wheel #2.
Figure 14:
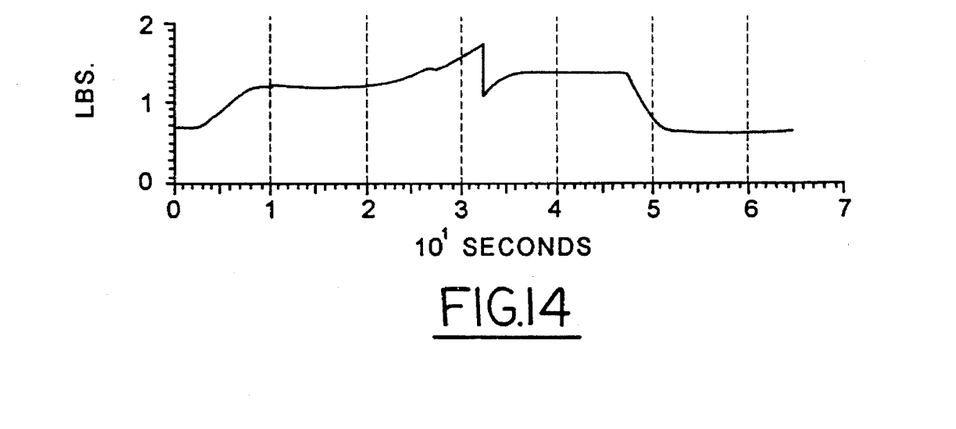
FIG. 14 is a graph showing force-time curve for sample steering wheel #2.

FIG. 13 is a graph showing a deflection versus time curve for sample steering wheel #2 showing that the deflection proceeds at a constant rate during the time period. FIG. 14 is a graph showing a force versus time curve for sample steering wheel #2 indicating a nearly constant force was applied on the steering wheel between the time intervals of approximately 10 seconds and approximately 20 seconds.

Figure 15:
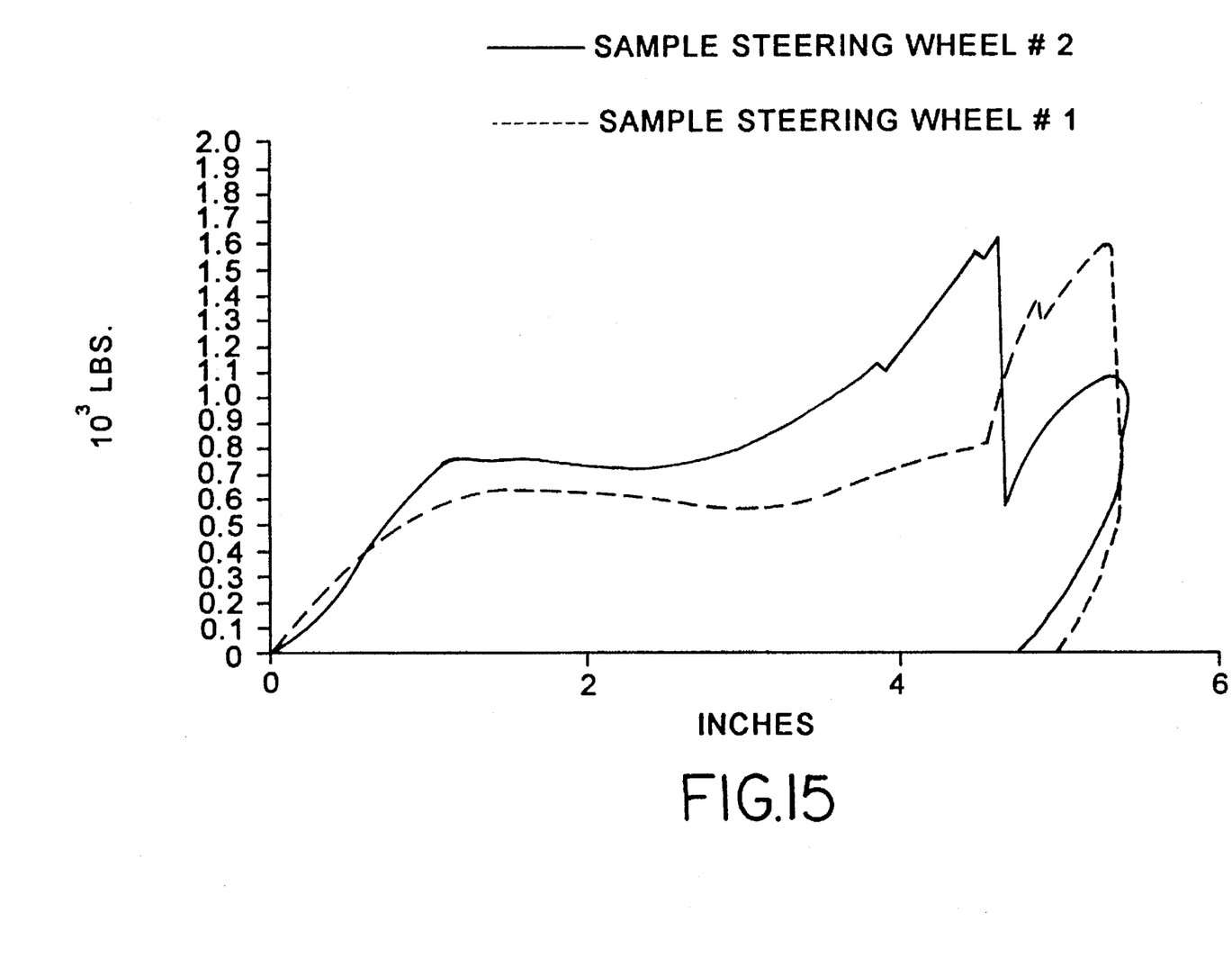
FIG. 15 is a graph showing the force-deflection curves for sample steering wheels #1 and #2.

FIG. 15 shows a graph of two load deflection curves for sample steering wheel #1 and sample steering #2, respectively, for comparison purpose. It is seen that while the two steering wheels yield at slightly different load levels, i.e. 650 pounds versus 764 pounds, the two steering wheels equipped with similar flange constructions behave very similarly during a load deflection test.

Figure 16:
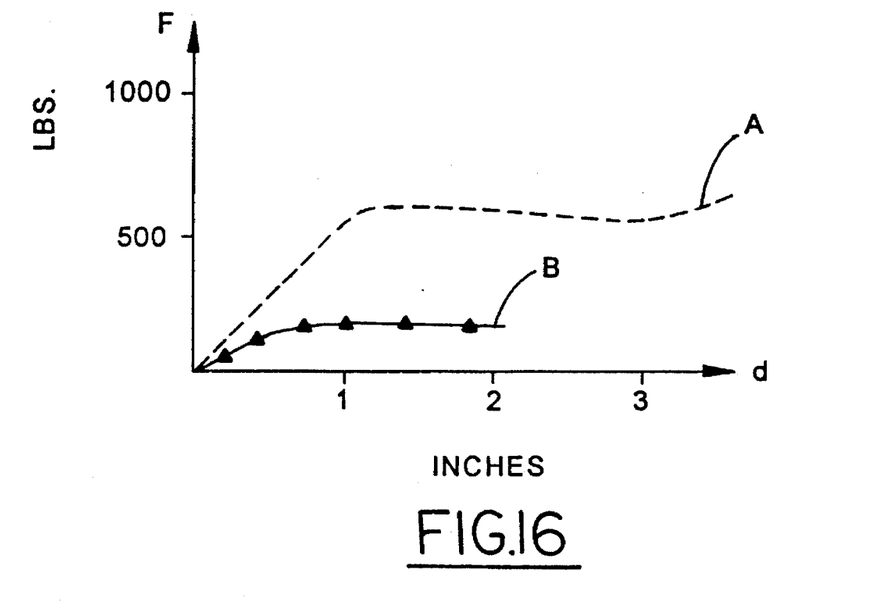
FIG. 16 is a graph showing force-deflection curves for sample steering wheel #1 and another sample steering wheel having smaller flanges.

FIG. 16 is a graph showing two curves wherein curve A is a load deflection curve of sample steering wheel #1 and curve B is a load deflection curve for a sample steering wheel having smaller flanges. It is seen from curve B that the smaller flanges contribute to a smaller load-carrying capability of the steering wheel. The flange depth in the sample steering wheel represented by curve B is smaller than ⅛".

Figure 17:
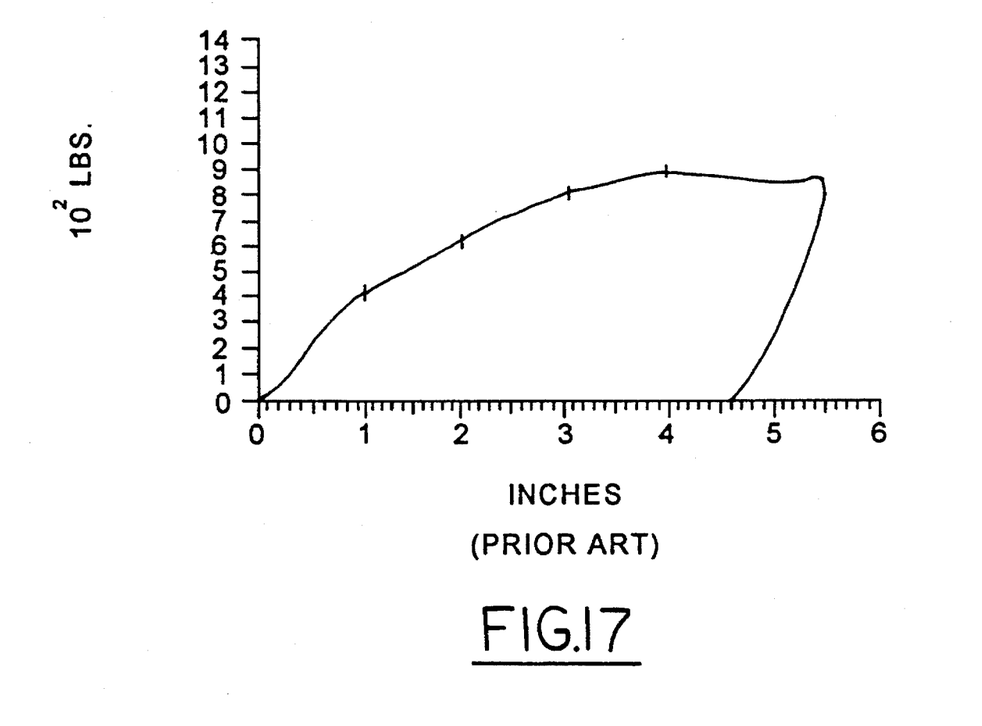
FIG. 17 is a graph showing a force-deflection curve for a steering wheel that has no flanges.

FIG. 17 is a graph showing a load deflection curve for a sample steering wheel having no flanges on the rim portion, the spoke portion and the hub portion. The importance of the flanges is self evident from an observation of the curve which showed no yield point and no yielding behavior at constant load. The load on the steering wheel increases continuously until a complete failure of the wheel occurs at approximately 5" deflection. The material used in the steering wheel is the same as the material used in sample steering wheel #1 and #2.

Figure 18:
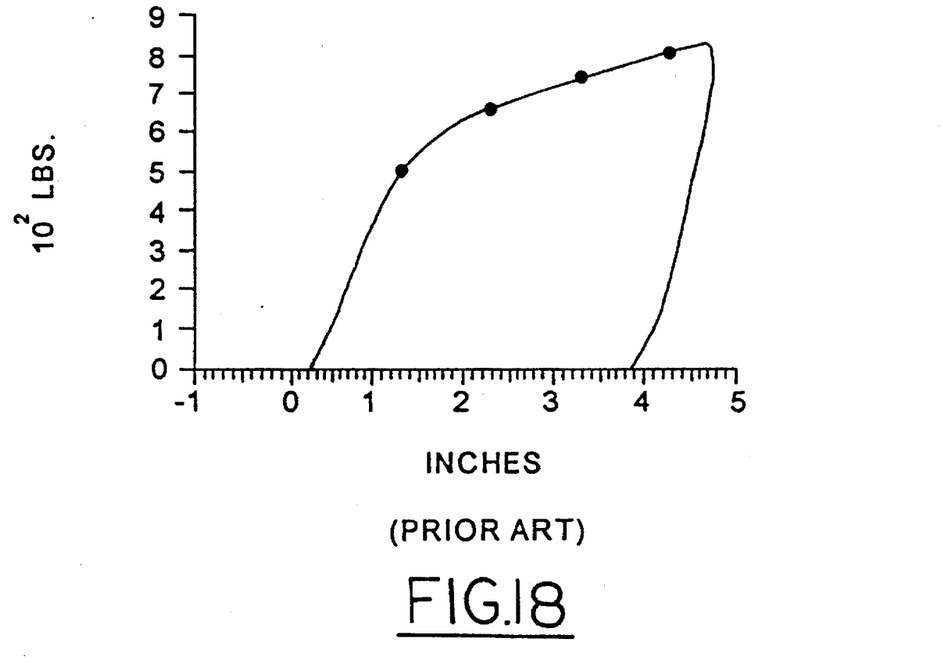
FIG. 18 is a graph showing a force-deflection curve for another sample steering wheel made of a different material and designed with no flanges.

FIG. 18 shows a graph of a force-deflection curve for a sample steering wheel that has no built-in flanges and is made of a different material. The rim portion of the wheel is made of steel while the spoke and the hub portions of the wheel are made of aluminum. It is seen from FIG. 18 that the load increases continuously until a total failure is reached at approximately 4" deflection. No yielding behavior at a constant load level is observed. A steering wheel of this design does not provide a safe driving environment for a vehicle operator and may cause injuries to the operator in the event of an impact.

Figure 19:
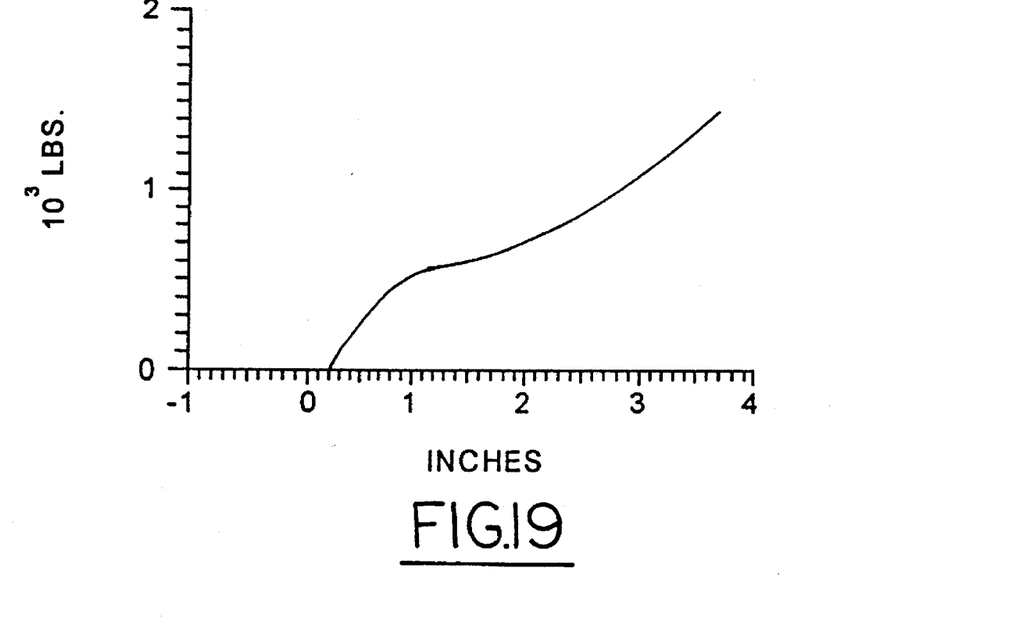
FIG. 19 is a graph showing a force-deflection curve for another sample steering wheel made of a different material and designed with flanges.

FIG. 19 is a graph showing a force-deflection curve for a sample steering wheel that is equipped with flanges and is made of an aluminum material without magnesium. A small plateau (constant load) area in the curve is observed between 1" deflection and 2" deflection. The yielding at such a constant load is not as desirable as the yielding behavior shown by sample steering wheel #1 and #2 which are made of an aluminum alloy containing at least 1% magnesium. A prolonged yielding behavior was seen in the latter samples.

While the present invention has been described in an illustrative manner, it should be understood that the terminology used is intended to be in a nature of words of description rather than of limitation.

Furthermore, while the present invention has been described in terms of a preferred embodiment and an alternate embodiment thereof, it is to be appreciated that those skilled in the art will readily apply these teachings to other possible variations of the invention. For instance, other configurations for the continuous flanges may be utilized on the rim, the spoke and the hub portion of the steering wheel while achieving the same desirable results achieved by the present invention. Other possible materials, different than that taught by the present invention may also be suitably used in the steering wheel.

The embodiments of the invention in which an exclusive property or privilege is claimed are defined as follows.

I claim:

1. A vehicle steering wheel comprising a one piece aluminum structure having rim, spoke and hub portions arranged in the same plane and each having continuous downwardly extending flanges from said plane which enables said rim, spoke and hub portions to collapse simultaneously at the same load upon impact by the body of a vehicle operator during a vehicle impact.

2. A vehicle steering wheel according to claim 1, wherein said continuous downwardly extending flanges have a depth between about ⅛" and about 1".

3. A vehicle steering wheel according to claim 1, wherein said continuous downwardly extending flanges have a depth in the range between about ¼" and about ½".

4. A vehicle steering wheel according to claim 1, wherein said one piece aluminum structure is made of an aluminum alloy containing at least 95% aluminum.

5. A vehicle steering wheel according to claim 1, wherein said one piece aluminum structure is made of an aluminum alloy containing at least 95% aluminum and at least 1% magnesium.

6. A vehicle steering wheel according to claim 1, wherein said one piece aluminum structure collapses upon impact by a minimum load of 650 pounds.

7. A vehicle steering wheel according to claim 1, wherein said one piece aluminum structure produces a minimal of 4" deformation upon impact by a minimum load of 650 pounds.

8. A vehicle steering wheel comprising a one piece aluminum structure having a rim, a spoke and a hub portion arranged in the same plane and each having continuous downwardly extending flanges from said plane and is made of an aluminum/magnesium alloy comprising at least 95% aluminum, said flanges enable said rim, spoke and hub portions to collapse simultaneously at the same load when hit by the body of a vehicle operator during a vehicle impact.

9. A vehicle steering wheel according to claim 8, wherein said continuous downwardly extending flanges having a depth between about ⅛" and about 1".

10. A vehicle steering wheel according to claim 8, wherein said continuous downwardly extending flanges having a depth between about ¼" and about ½".

11. A vehicle steering wheel according to claim 8, wherein said one piece aluminum structure comprising at least 95% aluminum and at least 1% magnesium.

12. A vehicle steering wheel according to claim 8, wherein said one piece aluminum structure comprising at least 95% aluminum, at least 1% magnesium with the balance having at least some silicon, iron, manganese and zinc.

13. A vehicle steering wheel according to claim 8, wherein said one piece aluminum structure comprising of between about 95% to about 98% aluminum, between about 1% to about 4% magnesium with the balance having at least some silicon, iron, manganese and zinc.

14. A vehicle steering wheel comprising, a rim portion being generally circular and adapted to be grasped by A hand having continuous downwardly extending flanges from a plane of said rim portion, a hub portion arranged in the same plane of said rim portion having similarly downwardly extending flanges from said plane adapted to be axially secured to a steering shaft, at least one spoke portion arranged in the same plane of said rim portion interconnecting said rim portion with said hub portion having similarly downwardly extending flanges from said plane, whereby said continuous downwardly extending flanges of saim rim portion, said hub portion and said at least one spoke portion enable said steering wheel to collapse equally in the rim portion, the at least one spoke portion and the hub portion during a vehicle impact when hit by the body of a vehicle operator.

15. A vehicle steering wheel according to claim 14, wherein said at least one spoke portion having two broad arms—left and right—downwardly angled from said hub portion and integrating with said rim portion.

16. A vehicle steering wheel according to claim 14, wherein said at least one spoke portion further comprising three broad arms—left, right and central—downwardly angled from said hub portion and integrating with said rim portion.

17. A vehicle steering wheel according to claim 14, wherein said rim portion, said at least one spoke portion and said hub portion being made of an alloy comprising at least 95% aluminum.

18. A vehicle steering wheel according to claim 14, wherein said rim portion, said at least one spoke portion and said hub portion being made of an alloy material comprising at least 95% aluminum and at least 1% magnesium.

19. A vehicle steering wheel according to claim 14, wherein said rim portion, said at least one spoke portion and said hub portion being made of an alloy material comprising between about 95% to about 98% aluminum, between about 1% to about 4% magnesium with the balance having at least some silicon, iron, manganese and zinc.

20. A vehicle steering wheel according to claim 14, wherein said steering wheel collapses equally in the rim portion, the at least one spoke portion and the hub portion during a vehicle impact when hit by a minimum load of 650 pounds.

* * * * *